United States Patent
Wu et al.

(10) Patent No.: US 12,202,040 B2
(45) Date of Patent: Jan. 21, 2025

(54) METHOD FOR PREPARING Mg-RE ALLOYS WITH HIGH STRENGTH AND DUCTILITY USING SELECTIVE LASER MELTING ADDITIVE MANUFACTURING TECHNOLOGY

(71) Applicant: SHANGHAI JIAO TONG UNIVERSITY, Shanghai (CN)

(72) Inventors: Yujuan Wu, Shanghai (CN); Qingchen Deng, Shanghai (CN); Liming Peng, Shanghai (CN); Yuanhang Luo, Shanghai (CN); Ning Su, Shanghai (CN); Zhiyu Chang, Shanghai (CN); Xiaoyu Xue, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 29 days.

(21) Appl. No.: 17/769,325

(22) PCT Filed: Sep. 27, 2020

(86) PCT No.: PCT/CN2020/118093
§ 371 (c)(1),
(2) Date: Apr. 14, 2022

(87) PCT Pub. No.: WO2021/073404
PCT Pub. Date: Apr. 22, 2021

(65) Prior Publication Data
US 2024/0123499 A1    Apr. 18, 2024

(30) Foreign Application Priority Data

Oct. 15, 2019 (CN) .......................... 201910992966.0

(51) Int. Cl.
*B22F 10/28* (2021.01)
*B22F 9/08* (2006.01)
(Continued)

(52) U.S. Cl.
CPC .............. *B22F 10/28* (2021.01); *B22F 9/082* (2013.01); *B22F 10/34* (2021.01); *B22F 10/36* (2021.01);
(Continued)

(58) Field of Classification Search
CPC .......... B22F 10/00; B22F 10/28; B22F 10/32; B22F 10/34; B22F 10/36; B22F 10/366;
(Continued)

(56) References Cited

FOREIGN PATENT DOCUMENTS

| CN | 108411296 A | * | 8/2018 | |
| CN | 108907214 A | * | 11/2018 | ............ B22F 1/0007 |

(Continued)

OTHER PUBLICATIONS

Errors in Machine Processing. ISSN 978-5165-0652-3, p. 138-139. Reference D4 from the Written Opinion of the Int. Searching Authority (Year: 2015).*

(Continued)

*Primary Examiner* — Moshe Wilensky
(74) *Attorney, Agent, or Firm* — Bayramoglu Law Offices LLC

(57) ABSTRACT

A method for preparing Mg-RE alloys with high strength and ductility using selective laser melting (SLM) additive manufacturing technology includes the following steps of: A. preparing Mg-RE-(Zn)—Zr pre-alloyed spherical powder by gas atomization; B. molding the Mg-RE-(Zn)—Zr pre-alloyed spherical powder using SLM to obtain the Mg-RE alloys with high strength and ductility; and C. conducting heat treatment on the Mg-RE alloys prepared in step B: solid solution+aging treatment or only aging treatment The method adjusts and controls microstructure and mechanical properties of the alloys by adjusting and controlling process parameters of SLM (laser power, scanning speed, hatch spacing, spot diameter, layer thickness, inter- (Continued)

layer rotation angle, substrate preheating temperature, partition width and overlapping area width) and process parameters of subsequent heat treatment (temperature and time) to prepare the Mg-RE-(Zn)—Zr alloys with high strength and ductility using SLM process for the first time.

8 Claims, 3 Drawing Sheets

(51) Int. Cl.
  *B22F 10/34*  (2021.01)
  *B22F 10/36*  (2021.01)
  *B22F 10/366*  (2021.01)
  *B22F 10/64*  (2021.01)
  *B22F 10/32*  (2021.01)
  *B33Y 10/00*  (2015.01)
  *B33Y 80/00*  (2015.01)

(52) U.S. Cl.
  CPC ............ *B22F 10/366* (2021.01); *B22F 10/64* (2021.01); *B22F 10/32* (2021.01); *B22F 2301/058* (2013.01); *B33Y 10/00* (2014.12); *B33Y 80/00* (2014.12)

(58) Field of Classification Search
  CPC .... B22F 10/64; B22F 9/082; B22F 2301/058; B22F 3/24; B22F 2003/248; B22F 2998/10; B22F 1/05; B22F 1/065; B33Y 10/00; B33Y 80/00; B33Y 40/10; B33Y 70/00; C22C 1/0408; C22C 23/06; C22F 1/06

See application file for complete search history.

(56) References Cited

FOREIGN PATENT DOCUMENTS

| | | | |
|---|---|---|---|
| CN | 108913969 A | 11/2018 | |
| CN | 110064750 A * | 7/2019 | ........... A61L 27/047 |
| WO | 2011117630 A1 | 9/2011 | |

OTHER PUBLICATIONS

Printout of www.totalmateria.com/en-us/articles/practical-heat-treatment-magnesium-alloys (Year: 2006).*
English translation of CN 110064750 (Year: 2019).*
Selective Laser Melting of Magnesium and Magnesium Alloy Powders: A Review by Manakari et al. (Year: 2017).*
Matthias Gieseke, et al., Selektives Laserstrahlschmelzen von Elektron MAP 43 Magnesiumpulver, Rapid. Tech-International Trade Show & Conference for Additive Manufacturing, 2016, pp. 244-252, Proceedings of the 13th Rapid. Tech Conference, Erfurt, Germany.
Alexander Kopp, et al., Influence of design and postprocessing parameters on the degradation behavior and mechanical properties of additively manufactured magnesium scaffolds, Acta Biomaterialia, 2019, pp. 23-35, vol. 98.
Naemi A. Zumdick, et al., Additive manufactured WE43 magnesium: A comparative study of the microstructure and mechanical properties with those of powder extruded and as-cast WE43, Materials Characterization, 2019, pp. 384-397, vol. 147.

* cited by examiner

METHOD FOR PREPARING Mg-RE ALLOYS WITH HIGH STRENGTH AND DUCTILITY USING SELECTIVE LASER MELTING ADDITIVE MANUFACTURING TECHNOLOGY

CROSS REFERENCE TO THE RELATED APPLICATIONS

This application is the national phase entry of International Application No. PCT/CN2020/118093, filed on Sep. 27, 2020, which is based upon and claims priority to Chinese Patent Application No. 201910992966.0, filed on Oct. 15, 2019, the entire contents of which are incorporated herein by reference.

TECHNICAL FIELD

The disclosure relates to the technical field of preparing non-ferrous alloys, in particular to a method for preparing magnesium-rare earth (Mg-RE) alloys with high strength and ductility using selective laser melting (SLM) additive manufacturing technology.

BACKGROUND

As the lightest metal structural material, magnesium alloys have the advantages of low density, high specific strength and high specific stiffness, and have a very broad application prospect in rail transit, aerospace and 3C products. At present, the commercialized magnesium alloys in the market mainly include Mg—Al and Mg—Zn alloys. However, these magnesium alloys have low absolute strength and poor ductility, which limits the further application of magnesium alloys. Mg-RE alloys have excellent solid solution strengthening effect and age hardening effect, which makes it possible to develop magnesium alloys with high strength and ductility. In addition, adding Zn to Mg-RE alloys can not only control the aging precipitation microstructure of the alloy system, but also introduce a long-period stacking ordered structure (LPSO structure) under appropriate dosage and process conditions. A large number of studies show that the LPSO structure can further improve the strength and ductility of alloys. Adding a small amount of Zr is mainly to refine grains by providing heterogeneous nucleation particles.

Selective laser melting (SLM) is one of the most promising laser-assisted additive manufacturing methods at present. SLM can deposit metal parts with arbitrary complex shapes layer by layer, and can realize the preparation of high-quality complex parts which is difficult or even impossible to be realized by traditional casting. SLM is very suitable for personalized customization of complex components in small batches. On the other hand, the laser beam for fast scanning produces a tiny molten pool and a heat affected zone. Moreover, the extremely high cooling rate ($10^4$-$10^6$ K/s) can lead to the refinement of microstructure and the expansion of solid solubility, and the significant fine grain strengthening effect and solid solution strengthening effect generated make the mechanical properties of components prepared by SLM significantly higher than those of castings and close to those of forgings. Therefore, SLM is helpful to improve the properties of components needed in aerospace and automobile industries. With the increasingly serious environmental and energy problems, SLM technology of magnesium alloys will be one of the promising methods to control the microstructure and mechanical properties of magnesium alloys and develop high performance magnesium alloys and components made thereof.

At present, there are only a few reports on SLM technology of magnesium alloys at home and abroad, involving pure Mg, Mg—Al system and Mg—Zn system, but there is no report on SLM of Mg-RE (containing Gd) alloys. The tensile properties, creep resistance and stiffness of Mg-RE (containing Gd) alloys at room temperature and high temperature are obviously superior to those reported above. Besides, the thermal conductivity, solidification temperature range, thermal expansion coefficient, solidification shrinkage rate and other parameters of the Mg-RE alloys are different from those of the reported alloys, so the SLM process parameters of the reported alloys are not suitable for Mg-RE (Gd-containing) alloys. It is necessary to develop SLM process parameters suitable for Mg-RE (Gd-containing) alloys. In addition, the Mg-RE (containing Gd) alloys prepared by SLM technology have fine grains and secondary phases, small area fraction of secondary phases and high solid solubility in α-Mg matrix, which can produce significant fine grain strengthening effect and solid solution strengthening effect. Its microstructure and mechanical properties are superior to those of alloys made by traditional gravity casting. Therefore, if the SLM process is applied to the preparation of Mg-RE-(Zn)—Zr alloys, and the suitable molding process and subsequent heat treatment process of Mg-RE-(Zn)—Zr alloys are found, it is expected to develop Mg-RE alloys with high strength and ductility, and provide theoretical support for magnesium alloy parts in aerospace, automobile and other fields.

SUMMARY

The purpose of the disclosure is to fill up the blank of the prior preparation of Mg-RE-(Zn)—Zr alloys using SLM and provide a method for preparing Mg-RE alloys with high strength and ductility using SLM additive manufacturing technology. The method overcomes the key problems of coarse grain and eutectic phase, composition segregation, easy to produce defects such as porosity, shrinkage cavity, inclusions and poor mechanical properties of magnesium alloys made by traditional casting. Mg-RE-(Zn)—Zr prealloyed spherical powder is prepared by gas atomization. SLM, an efficient and flexible additive manufacturing method, is selected to prepare Mg-RE alloys with high strength and ductility, and the mechanical properties of the alloys are further improved by optimizing the subsequent heat treatment process (T6 or T5).

The SLM process parameters of the disclosure are the results of a large number of experiments summarized by the inventor in the early stage. For example, laser power is selected from 80 to 160 W, because the higher laser power will produce serious evaporation and splashing of magnesium powder, which will affect the stability of the molding, and the lower power cannot realize the interlayer metallurgical bonding of magnesium alloys. A laser scanning rate of 100-1000 mm/s is matched with the laser power to obtain the laser energy density needed for SLM molding of the magnesium alloys. It is also the first time that partition island scanning is applied to Mg-RE-(Zn)—Zr alloys to reduce the thermal stress during the molding and weaken cracking, and it is also the first time to carry out subsequent heat treatment on Mg-RE-(Zn)—Zr alloys in an SLM state, because pure Mg, Mg—Al and Mg—Zn alloys reported in the literature do not have the outstanding age hardening potential of Mg-RE-(Zn)—Zr alloys. To sum up, the SLM process parameters and subsequent heat treatment process parameters of the disclosure are specially designed for the specific composition of the Mg-RE-(Zn)—Zr alloys, studied and applied for the first time.

The disclosure prepares a new morphology in which grain boundary β phases in Mg-RE alloys are small in the content, fine and dispersed. The microstructure of the Mg-RE-(Zn)—Zr alloys in the SLM state has the following characteristics: grains of an α-Mg matrix are fine, uniform and supersaturated; grain boundary β phases are small in the content, fine and dispersed, without pores and poor fusion. The microstructure of Mg-RE-(Zn)—Zr alloys in T6 and T5 states is characterized by dense, fine and dispersed prismatic precipitates. In addition, basal faults or LPSO phases can be formed in Zn-containing alloys, which can be combined with prismatic aging precipitates to conduct multi-enhanced treatment.

The disclosure aims at adjusting the gas atomization pulverizing process to prepare Mg-RE pre-alloyed spherical powder with proper particle size distribution and specific composition. By adjusting the process parameters of SLM and subsequent heat treatment, the grain size, the number and morphology of grain boundary β phases and the size and number of aging precipitates of the Mg-RE alloys are controlled, so as to prepare the Mg-RE alloys with better strength and ductility than those of alloys made by traditional gravity casting.

The object of the disclosure is realized by means of the following technical schemes:

The disclosure provides a method for preparing Mg-RE alloys with high strength and ductility using SLM additive manufacturing technology, wherein the method comprises the following steps of:

A. preparing Mg-RE-(Zn)—Zr pre-alloyed spherical powder by gas atomization;

B. molding the Mg-RE-(Zn)—Zr pre-alloyed spherical powder using SLM to obtain the Mg-RE alloys with high strength and ductility which has fine grains (1-3 μm), uniform microstructure and high density; and C. conducting heat treatment on the Mg alloy prepared in step B: solid solution+aging treatment (T6) or only aging treatment (T5), to further improve mechanical properties.

Preferably, in step A, the Mg-RE pre-alloyed spherical powder with the specific composition above contains the following elements in weight percentages: RE 10-20%, Zn 0-2%, Zr 0-0.5%, with the balance being Mg and unavoidable impurities, wherein the total amount of impurities is less than 0.02%; the RE includes Gd, and other RE elements like Y can be added.

More preferably, the content of Zr is 0.3-0.5% in the Mg-RE pre-alloyed spherical powder.

Preferably, in step B, the Mg-RE-(Zn)—Zr pre-alloyed spherical powder with 200-300 mesh (an average particle size of 61 μm), 300-500 mesh (an average particle size of 42 μm) or more than 500 mesh (an average particle size of 34 μm) is selected for the SLM molding. If the particle size of the powder is too large, it will not be suitable for molding.

The disclosure adjusts and controls microstructure of the alloy by adjusting and controlling laser power, scanning speed, hatch spacing, spot diameter, layer thickness, interlayer rotation angle, substrate preheating temperature, partition width and overlapping area width of SLM and temperature and time of subsequent heat treatment. Compared with the prior magnesium alloy molding methods, this method has the advantages of high machining efficiency, high machining precision, controllable product microstructure, and high cooling rate leading to uniform and fine microstructure, etc., thus greatly improving mechanical properties.

Preferably, in step B, the spherical powder prepared in step A should be dried in a vacuum drying oven at 100-200° C. for 1-5 h before the SLM molding to remove vapor in the powder and improve the agglomeration of the powder for enhanced fluidity.

Preferably, in step B, related laser parameters adopted in the SLM molding are as follows: a laser power of 80-160 W, a scanning speed of 100-1000 mm/s, a hatch spacing of 50-100 μm, and a spot diameter of 65-150 μm.

Preferably, in step B, a laser scanning strategy adopted in the SLM molding is a partition island scanning strategy for reducing thermal stress concentration, with a partition width of 3-6 mm, an overlapping area width of 0.1-0.3 mm between partitions to improve their mechanical properties by improving the density of molded parts, and an interlayer rotation angle of 70-75° to weaken the anisotropy of mechanical properties of prepared components.

Preferably, in step B, other process parameters adopted in the SLM molding are as follows: a layer thickness of 20-40 μm to ensure interlayer metallurgical bonding; and a substrate preheating temperature of 25-200° C. to reduce the thermal stress by reducing temperature gradients of the molding.

Preferably, in step B, the SLM molding is carried out under the protection of argon, an inert gas, and oxygen and vapor in the molding cabin are lower than 100 ppm during the molding.

Preferably, in step C, the solid solution heat treatment is conducted at 450-520° C. for 15 min-2 h.

Preferably, in step C, the aging treatment is conducted at 175-225° C. for 0-512 h.

More preferably, the aging treatment is conducted at 200° C. for 64 h.

The disclosure further provides Mg-RE alloys with high strength and ductility prepared according to the method, wherein the Mg-RE alloys are Mg-RE-(Zn)—Zr alloys.

Preferably, the Mg-RE-(Zn)—Zr alloys contain the following elements in weight percentages: RE 10-20%, Zn 0-2%, Zr 0-0.5%, Mg and unavoidable impurities, and the total amount of impurities is less than 0.02%; the RE certainly includes Gd, and other RE elements like Y can be added.

Compared with the prior art, the disclosure has the following beneficial effects:

1. The disclosure has a short SLM molding period, and parts with arbitrary complex shapes can be directly molded, with high density, stability and repeatability.
2. The SLM of the disclosure is carried out under the protection of argon, so as to avoid violent oxidation of the powder.
3. The microstructure of the product prepared by the disclosure is improved: the grains of the α-Mg matrix are fine, uniform and supersaturated; grain boundary β phases are small in the content, fine and dispersed, with nanoscale basal stacking faults and without pores and poor fusion.
4. The SLM product prepared by the disclosure has good mechanical properties: the tensile yield strength, tensile strength and elongation of a Mg-11.16Gd-1.72Zn-0.44Zr (wt. %) alloy in the SLM state are 252 MPa, 275 MPa and 4.3% at room temperature. Its strength and ductility are better than those of an alloy in a semi-continuous casting with the same composition (a yield strength of 163 MPa; a tensile strength of 210 MPa; an elongation of 3.6%) at room temperature. Compared with those in the semi-continuous casting state, the yield strength, tensile strength and elongation in the SLM state are increased by 54.6%, 31.0% and 19.4% respectively.

5. The mechanical properties of the product in the SLM state prepared by the disclosure are further improved after subsequent heat treatment: After solid solution+ aging heat treatment, the product in a T6 state at room temperature has a high tensile yield strength of 260 MPa, a tensile strength of 346 MPa, and an elongation of 4.8%, which is significantly better than those in a semi-continuous casting T6 state at room temperature (with a yield strength of 186 MPa, a tensile strength of 258 MPa, and an elongation of 4.6%). Compared with the semi-continuous casting T6 state, the yield strength, tensile strength and elongation of the SLM-T6 state are increased by 39.8%, 34.1% and 4.3% respectively. After only aging treatment, the alloy has greatly improved strength but poor ductility. The alloy in a T5 state at room temperature has a tensile yield strength of 382 MPa, a tensile strength of 385 MPa, and an elongation of 0.4%. Compared with the SLM state, the yield strength and tensile strength in the SLM-T5 state are increased by 51.6% and 40%, and the elongation in the SLM-T5 state is decreased by 90.7%.

BRIEF DESCRIPTION OF THE DRAWINGS

Other features, objectives and advantages of the disclosure will become more apparent by reading the detailed description of non-limiting embodiments with reference to the following drawings.

DETAILED DESCRIPTION OF THE EMBODIMENTS

The disclosure is described in detail as follows with reference to specific embodiments. The following embodiments will help provide further understanding of the disclosure for those skilled in the art, and not in any way limit the disclosure. It shall be noted that several changes and improvements can be made without departing from concept of the disclosure for ordinary persons skilled in the art. All these fall within the protection scope of the disclosure.

Embodiment 1

The embodiment provides a method for preparing Mg-RE alloys with high strength and ductility using SLM additive manufacturing technology, wherein the method comprises the following steps:

1) Mg-11.16Gd-1.72Zn-0.44Zr (wt. %) alloy powder is prepared by gas atomization and screened, and the powder with 300-500 mesh (with an average particle size of 42 μm) is selected for SLM molding.

2) The powder is dried at 200° C. for 5 h in a vacuum drying oven, and then loaded into a powder bed of an SLM device. The substrate is preheated to 200° C., and argon, a protective gas, is introduced to carry out gas circulation. The SLM molding is started when oxygen and vapor contents in a molding cabin is lower than 100 ppm.

3) Related laser parameters adopted in the SLM molding are as follows: a laser power of 80 W, a scanning speed of 500 mm/s, a hatch spacing of 100 μm, a spot diameter of 100 μm, a layer thickness of 30 μm and an interlayer rotation angle of 73°. A laser scanning strategy adopted is a partition island scanning strategy, with a partition width of 5 mm and an overlapping area width of 0.2 mm between partitions.

4) T4 treatment is conducted on the magnesium alloy in the SLM state prepared in the above 3): The treatment is conducted in an air resistance furnace. Pyrites are put into the furnace to carry out flame retardant protection on the alloy with $SO_2$ gas released by thermal decomposition. Single-step solid solution treatment is adopted: Solid solution is conducted at 480° C. for 1 h, and quenching is then conducted in cold water at 20° C.

5) The magnesium alloy in the T4 state prepared in the above 4) is treated by artificial aging T6 in a constant-temperature oil bath furnace and in a single step. The aging treatment is conducted at 200° C. for 64 h, and quenching is then conducted in cold water at 20° C.

6) T5 treatment is conducted on the magnesium alloy in the SLM state prepared in the above 3): The treatment is conducted in the constant-temperature oil bath furnace and in a single-step aging way. The aging treatment is conducted at 200° C. for 64 h, and quenching is then conducted in cold water at 20° C.

7) The magnesium alloys in SLM, T4, T6 and T5 states prepared by 3), 4), 5) and 6) above are tested for tensile at room temperature by a Zwick BTC-Z100 electronic universal material testing machine, and tensile testing rate is 0.5 mm/min.

Figure 1A:
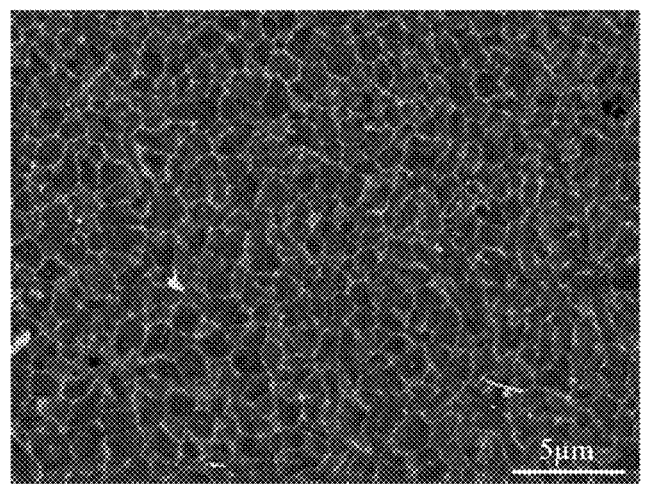
FIGS. 1A and 1B respectively show an optical microscope (OM) microstructure diagram and an scanning electron microscope (SEM) microstructure diagram of a Mg-11.16Gd-1.72Zn-0.44Zr (wt. %) alloy in an SLM state prepared according to embodiment 1 of the disclosure.
Figure 1B:
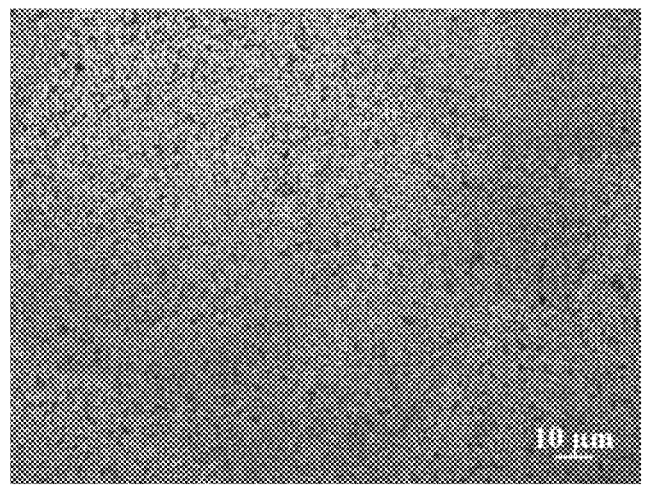
Figure 2:
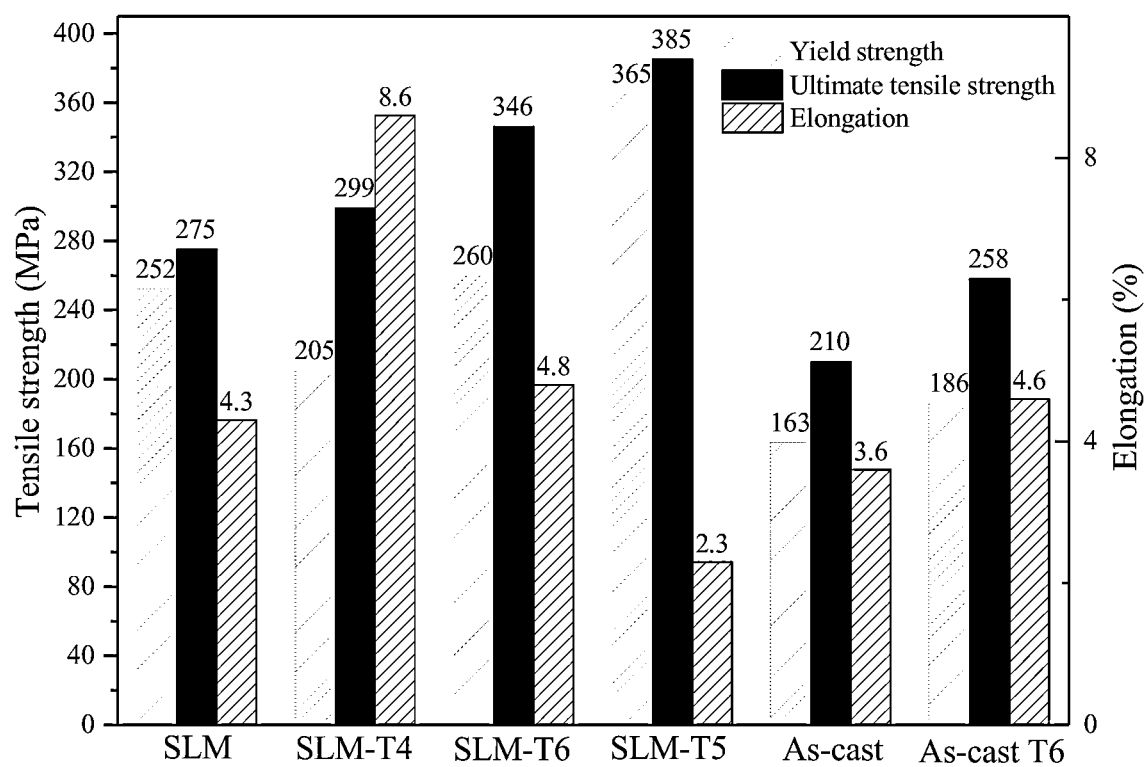
FIG. 2 is a comparative diagram of room-temperature tensile properties of the Mg-11.16Gd-1.72Zn-0.44Zr (wt. %) alloy in different states prepared according to embodiment 1 and comparative example 1 of the disclosure.

The microstructure of the obtained alloy in the SLM state is shown in FIGS. 1A and 1B: it shows typical rapid solidification characteristics, with grains of an α-Mg matrix being fine and uniform (1-3 μm), and grain boundary β phases being small in the content, fine and dispersed. The room-temperature tensile properties of the Mg-11.16Gd-1.72Zn-0.44Zr (wt. %) alloy in different states (SLM, SLM-T4, SLM-T6, SLM-T5) are shown in FIG. 2. In the SLM state at room temperature, the tensile yield strength, tensile strength and elongation are 252 MPa, 275 MPa, and 4.3% respectively. After solid solution+aging heat treatment, both strength and ductility are improved. In the T6 state at room temperature, the tensile yield strength, tensile strength and elongation are 260 MPa, 346 MPa, and 4.8% respectively. After only aging treatment, the alloy has greatly improved strength but poor ductility. In the T5 state at room temperature, the tensile yield strength, tensile strength and elongation are 365 MPa, 385 MPa, and 2.3% respectively.

Embodiment 2

The embodiment provides the method for preparing the Mg-RE alloys with high strength and ductility using SLM additive manufacturing technology, wherein the method comprises the following steps:

1) Mg-14.92Gd-0.30Zr (wt. %) alloy powder is prepared by gas atomization and screened, and the powder with 300-500 mesh (with an average particle size of 42 μm) is selected for the SLM molding.
2) The powder is dried at 200° C. for 5 h in the vacuum drying oven, and then loaded into the powder bed of the SLM device. The substrate is preheated to 150° C., and the argon, a protective gas, is introduced to carry out gas circulation. The SLM molding is started when oxygen and vapor contents in the molding cabin is lower than 100 ppm.
3) Related laser parameters adopted in the SLM molding are as follows: a laser power of 80 W, a scanning speed of 100 mm/s, a hatch spacing of 100 μm, a spot diameter of 100 μm, a layer thickness of 2 μm and an interlayer rotation angle of 70°. The laser scanning strategy adopted is the partition island scanning strategy, with a partition width of 4 mm and an overlapping area width of 0.3 mm between partitions.
4) The T4 treatment is conducted on the magnesium alloy in the SLM state prepared in the above 3): The treatment is conducted in the air resistance furnace. Pyrites are put into the furnace to carry out flame retardant protection on the alloy with $SO_2$ gas released by thermal decomposition. The single-step solid solution treatment is adopted: Solid solution is conducted at 520° C. for 15 min, and quenching is then conducted in cold water at 20° C.
5) The magnesium alloy in the T4 state prepared in the above 4) is treated by artificial aging T6 in the constant-temperature oil bath furnace and in a single step. The aging treatment is conducted at 200° C. for 64 h, and quenching is then conducted in cold water at 20° C.
6) The T5 treatment is conducted on the magnesium alloy in the SLM state prepared in the above 3): The treatment is conducted in the constant-temperature oil bath furnace and in a single-step aging way. The aging treatment is conducted at 200° C. for 64 h, and quenching is then conducted in cold water at 20° C.
7) The magnesium alloys in SLM, T4, T6 and T5 states prepared by 3), 4), 5) and 6) above are tested for tensile at room temperature by the Zwick BTC-Z100 electronic universal material testing machine, and the tensile testing rate is 0.5 mm/min.

The obtained alloy in the SLM state shows typical characteristics of rapidly solidified fine grains, with the grains of an α-Mg matrix being fine and uniform (1-3 μm), and the grain boundary β phases being small in the content, fine and dispersed. In the SLM state at room temperature, the tensile yield strength, tensile strength and elongation are 306 MPa, 310 MPa, and 0.7% respectively. In the T6 state at room temperature, the tensile yield strength, tensile strength and elongation are 308 MPa, 337 MPa, and 0.3% respectively. In the T5 state at room temperature, the tensile yield strength, tensile strength and elongation are 340 MPa, 343 MPa, and 0.4% respectively.

Embodiment 3

The embodiment provides the method for preparing the Mg-RE alloys with high strength and ductility using SLM additive manufacturing technology, wherein the method comprises the following steps:

1) Mg-19.89Gd (wt. %) alloy powder is prepared by gas atomization and screened, and the powder with more than 500 mesh (with an average particle size of 34 μm) is selected for the SLM molding.
2) The powder is dried at 150° C. for 4 h in the vacuum drying oven, and then loaded into the powder bed of the SLM device. The substrate is preheated to 100° C., and the argon, a protective gas, is introduced to carry out gas circulation. The SLM molding is started when oxygen and vapor contents in the molding cabin is lower than 100 ppm.
3) Related laser parameters adopted in the SLM molding are as follows: a laser power of 160 W, a scanning speed of 1000 mm/s, a hatch spacing of 50 μm, a spot diameter of 65 μm, a layer thickness of 40 μm and an interlayer rotation angle of 75°. The laser scanning strategy adopted is the partition island scanning strategy, with a partition width of 3 mm and an overlapping area width of 0.1 mm between partitions.
4) The T4 treatment is conducted on the magnesium alloy in the SLM state prepared in the above 3): The treatment is conducted in the air resistance furnace. Pyrites are put into the furnace to carry out flame retardant protection on the alloy with $SO_2$ gas released by thermal decomposition. The single-step solid solution treatment is adopted: Solid solution is conducted at 520° C. for 2 h, and quenching is then conducted in cold water at 20° C.
5) The magnesium alloy in the T4 state prepared in the above 4) is treated by artificial aging T6 in the constant-temperature oil bath furnace and in a single step. The aging treatment is conducted at 175° C. for 512 h, and quenching is then conducted in cold water at 20° C.
6) T5 treatment is conducted on the magnesium alloy in the SLM state prepared in the above 3): The treatment is conducted in the constant-temperature oil bath furnace and in a single-step aging way. The aging treatment is conducted at 175° C. for 512 h, and quenching is then conducted in cold water at 20° C.
7) The magnesium alloys in SLM, T4, T6 and T5 states prepared by 3), 4), 5) and 6) above are tested for tensile at room temperature by the Zwick BTC-Z100 electronic universal material testing machine, and the tensile testing rate is 0.5 mm/min.

The obtained alloy in the SLM state shows typical characteristics of rapidly solidified fine grains, with the grains of an α-Mg matrix being fine and uniform (1-3 μm), and the grain boundary β phases being small in the content, fine and dispersed. In the SLM state at room temperature, the tensile yield strength, tensile strength and elongation are 358 MPa, 362 MPa, and 0.7% respectively. In the T6 state at room temperature, the tensile yield strength, tensile strength and elongation are 365 MPa, 374 MPa, and 0.5% respectively. In the T5 state at room temperature, the tensile yield strength, tensile strength and elongation are 410 MPa, 418 MPa, and 0.3% respectively.

Embodiment 4

The embodiment provides the method for preparing the Mg-RE alloys with high strength and ductility using SLM additive manufacturing technology, wherein the method comprises the following steps:

1) The Mg-14.92Gd-0.30Zr (wt. %) alloy powder is prepared by gas atomization and screened, and the powder with 200-300 mesh (with an average particle size of 61 μm) is selected for the SLM molding.
2) The powder is dried at 100° C. for 1 h in the vacuum drying oven, and then loaded into the powder bed of the SLM device. The substrate is preheated to 180° C., and the argon, a protective gas, is introduced to carry out gas circulation. The SLM molding is started when oxygen and vapor contents in the molding cabin is lower than 100 ppm.

3) Related laser parameters adopted in the SLM molding are as follows: a laser power of 120 W, a scanning speed of 300 mm/s, a hatch spacing of 100 μm, a spot diameter of 90 μm, a layer thickness of 30 μm and an interlayer rotation angle of 71°. The laser scanning strategy adopted is the partition island scanning strategy, with a partition width of 6 mm and an overlapping area width of 0.2 mm between partitions.

4) The T4 treatment is conducted on the magnesium alloy in the SLM state prepared in the above 3): The treatment is conducted in the air resistance furnace. Pyrites are put into the furnace to carry out flame retardant protection on the alloy with $SO_2$ gas released by thermal decomposition. The single-step solid solution treatment is adopted: Solid solution is conducted at 520° C. for 0.5 h, and quenching is then conducted in cold water at 20° C.

5) The magnesium alloy in the T4 state prepared in the above 4) is treated by artificial aging T6 in the constant-temperature oil bath furnace and in a single step. The aging treatment is conducted at 200° C. for 64 h, and quenching is then conducted in cold water at 20° C.

6) The T5 treatment is conducted on the magnesium alloy in the SLM state prepared in the above 3): The treatment is conducted in the constant-temperature oil bath furnace and in a single-step aging way. The aging treatment is conducted at 200° C. for 64 h, and quenching is then conducted in cold water at 20° C.

7) The magnesium alloys in SLM, T4, T6 and T5 states prepared by 3), 4), 5) and 6) above are tested for tensile at room temperature by the Zwick BTC-Z100 electronic universal material testing machine, and the tensile testing rate is 0.5 mm/min.

The microstructure of the obtained alloy in the SLM state shows typical rapid solidification characteristics, with the grains of an α-Mg matrix being fine and uniform (1-3 μm), and the grain boundary β phases being small in the content, fine and dispersed. In the SLM state at room temperature, the tensile yield strength, tensile strength and elongation are 245 MPa, 246 MPa, and 0.1% respectively. In the T6 state at room temperature, the tensile yield strength, tensile strength and elongation are 296 MPa, 365 MPa, and 0.4% respectively. In the T5 state at room temperature, the tensile yield strength, tensile strength and elongation are 302 MPa, 363 MPa, and 0.3% respectively.

Embodiment 5

The embodiment provides the method for preparing the Mg-RE alloys with high strength and ductility using SLM additive manufacturing technology, wherein the method comprises the following steps:

1) Mg-14.24Gd-0.76Zn-0.32Zr (wt. %) alloy powder is prepared by gas atomization and screened, and the powder with 200-300 mesh (with an average particle size of 61 μm) is selected for the SLM molding.

2) The powder is dried at 100° C. for 4 h in the vacuum drying oven, and then loaded into the powder bed of the SLM device. The substrate is preheated to 130° C., and the argon, a protective gas, is introduced to carry out gas circulation. The SLM molding is started when oxygen and vapor contents in the molding cabin is lower than 100 ppm.

3) Related laser parameters adopted in the SLM molding are as follows: a laser power of 160 W, a scanning speed of 700 mm/s, a hatch spacing of 70 μm, a spot diameter of 100 μm, a layer thickness of 20 μm and an interlayer rotation angle of 74°. The laser scanning strategy adopted is the partition island scanning strategy, with a partition width of 4 mm and an overlapping area width of 0.2 mm between partitions.

4) The T4 treatment is conducted on the magnesium alloy in the SLM state prepared in the above 3): The treatment is conducted in the air resistance furnace. Pyrites are put into the furnace to carry out flame retardant protection on the alloy with $SO_2$ gas released by thermal decomposition. The single-step solid solution treatment is adopted: Solid solution is conducted at 520° C. for 2 h, and quenching is then conducted in cold water at 20° C.

5) The magnesium alloy in the T4 state prepared in the above 4) is treated by artificial aging T6 in the constant-temperature oil bath furnace and in a single step. The aging treatment is conducted at 200° C. for 64 h, and quenching is then conducted in cold water at 20° C.

6) The T5 treatment is conducted on the magnesium alloy in the SLM state prepared in the above 3): The treatment is conducted in the constant-temperature oil bath furnace and in a single-step aging way. The aging treatment is conducted at 200° C. for 64 h, and quenching is then conducted in cold water at 20° C.

7) The magnesium alloys in SLM, T4, T6 and T5 states prepared by 3), 4), 5) and 6) above are tested for tensile at room temperature by the Zwick BTC-Z100 electronic universal material testing machine, and the tensile testing rate is 0.5 mm/min.

The microstructure of the obtained alloy in the SLM state shows typical rapid solidification characteristics, with the grains of an α-Mg matrix being fine and uniform (1-3 μm), and the grain boundary β phases being small in the content, fine and dispersed. In the SLM state at room temperature, the tensile yield strength, tensile strength and elongation are 353 MPa, 388 MPa, and 1.4% respectively. In the T6 state at room temperature, the tensile yield strength, tensile strength and elongation are 315 MPa, 393 MPa, and 3.0% respectively. In the T5 state at room temperature, the tensile yield strength, tensile strength and elongation are 374 MPa, 396 MPa, and 0.9% respectively.

Embodiment 6

The embodiment provides the method for preparing the Mg-RE alloys with high strength and ductility using SLM additive manufacturing technology, wherein the method comprises the following steps:

1) Mg-10.02Gd-0.18Zn-0.34Zr (wt. %) alloy powder is prepared by gas atomization and screened, and the powder with 200-300 mesh (with an average particle size of 61 μm) is selected for the SLM molding.

2) The powder is dried at 100° C. for 5 h in the vacuum drying oven, and then loaded into the powder bed of the SLM device. The substrate is preheated to 170° C., and the argon, a protective gas, is introduced to carry out gas circulation. The SLM molding is started when oxygen and vapor contents in the molding cabin is lower than 100 ppm.

3) Related laser parameters adopted in the SLM molding are as follows: a laser power of 80 W, a scanning speed of 350 mm/s, a hatch spacing of 90 μm, a spot diameter of 100 μm, a layer thickness of 30 μm and an interlayer rotation angle of 73°. The laser scanning strategy adopted is the partition island scanning strategy, with a partition width of 6 mm and an overlapping area width of 0.3 mm between partitions.
4) The T4 treatment is conducted on the magnesium alloy in the SLM state prepared in the above 3): The treatment is conducted in the air resistance furnace. Pyrites are put into the furnace to carry out flame retardant protection on the alloy with $SO_2$ gas released by thermal decomposition. The single-step solid solution treatment is adopted: Solid solution is conducted at 450° C. for 1 h, and quenching is then conducted in cold water at 20° C.
5) The magnesium alloy in the T4 state prepared in the above 4) is treated by artificial aging T6 in the constant-temperature oil bath furnace and in a single step. The aging treatment is conducted at 175° C. for 128 h, and quenching is then conducted in cold water at 20° C.
6) The T5 treatment is conducted on the magnesium alloy in the SLM state prepared in the above 3): The treatment is conducted in the constant-temperature oil bath furnace and in a single-step aging way. The aging treatment is conducted at 175° C. for 128 h, and quenching is then conducted in cold water at 20° C.
7) The magnesium alloys in SLM, T4, T6 and T5 states prepared by 3), 4), 5) and 6) above are tested for tensile at room temperature by the Zwick BTC-Z100 electronic universal material testing machine, and the tensile testing rate is 0.5 mm/min.

The microstructure of the obtained alloy in the SLM state shows typical rapid solidification characteristics, with the grains of an α-Mg matrix being fine and uniform (1-3 μm), and the grain boundary β phases being small in the content, fine and dispersed. In the SLM state at room temperature, the tensile yield strength, tensile strength and elongation are 194 MPa, 253 MPa, and 6.2% respectively. In the T6 state at room temperature, the tensile yield strength, tensile strength and elongation are 217 MPa, 298 MPa, and 4.5% respectively. In the T5 state at room temperature, the tensile yield strength, tensile strength and elongation are 243 MPa, 306 MPa, and 3.4% respectively.

Embodiment 7

The embodiment provides the method for preparing the Mg-RE alloys with high strength and ductility using SLM additive manufacturing technology, wherein the method comprises the following steps:
1) Mg-10.08Gd-0.37Zr (wt. %) alloy powder is prepared by gas atomization and screened, and the powder with more than 500 mesh (with an average particle size of 34 μm) is selected for the SLM molding.
2) The powder is dried at 100° C. for 3 h in the vacuum drying oven, and then loaded into the powder bed of the SLM device. The substrate is kept at a room temperature of 25° C., and the argon, a protective gas, is introduced to carry out gas circulation. The SLM molding is started when oxygen and vapor contents in the molding cabin is lower than 100 ppm.
3) Related laser parameters adopted in the SLM molding are as follows: a laser power of 80 W, a scanning speed of 800 mm/s, a hatch spacing of 100 μm, a spot diameter of 150 μm, a layer thickness of 40 μm and an interlayer rotation angle of 74°. The laser scanning strategy adopted is the partition island scanning strategy, with a partition width of 6 mm and an overlapping area width of 0.3 mm between partitions.
4) The T4 treatment is conducted on the magnesium alloy in the SLM state prepared in the above 3): The treatment is conducted in the air resistance furnace. Pyrites are put into the furnace to carry out flame retardant protection on the alloy with $SO_2$ gas released by thermal decomposition. The single-step solid solution treatment is adopted: Solid solution is conducted at 450° C. for 1 h, and quenching is then conducted in cold water at 20° C.
5) The magnesium alloy in the T4 state prepared in the above 4) is treated by artificial aging T6 in the constant-temperature oil bath furnace and in a single step. The aging treatment is conducted at 175° C. for 128 h, and quenching is then conducted in cold water at 20° C.
6) The T5 treatment is conducted on the magnesium alloy in the SLM state prepared in the above 3): The treatment is conducted in the constant-temperature oil bath furnace and in a single-step aging way. The aging treatment is conducted at 175° C. for 128 h, and quenching is then conducted in cold water at 20° C.
7) The magnesium alloys in SLM, T4, T6 and T5 states prepared by 3), 4), 5) and 6) above are tested for tensile at room temperature by the Zwick BTC-Z100 electronic universal material testing machine, and the tensile testing rate is 0.5 mm/min.

The microstructure of the obtained alloy in the SLM state shows typical rapid solidification characteristics, with the grains of an α-Mg matrix being fine and uniform (1-3 μm), and the grain boundary β phases being small in the content, fine and dispersed. In the SLM state at room temperature, the tensile yield strength, tensile strength and elongation are 187 MPa, 243 MPa, and 5.7% respectively. In the T6 state at room temperature, the tensile yield strength, tensile strength and elongation are 208 MPa, 285 MPa, and 4.3% respectively. In the T5 state at room temperature, the tensile yield strength, tensile strength and elongation are 235 MPa, 297 MPa, and 3.1% respectively.

Embodiment 8

The embodiment provides the method for preparing the Mg-RE alloys with high strength and ductility using SLM additive manufacturing technology, wherein the method comprises the following steps:
1) Mg-10Gd-3Y-1Zn-0.40Zr (wt. %) alloy powder is prepared by gas atomization and screened, and the powder with 300-500 mesh (with an average particle size of 42 μm) is selected for SLM molding.
2) The powder is dried at 150° C. for 3 h in the vacuum drying oven, and then loaded into the powder bed of the SLM device. The substrate is preheated to 200° C., and the argon, a protective gas, is introduced to carry out gas circulation. The SLM molding is started when oxygen and vapor contents in the molding cabin is lower than 100 ppm.
3) Related laser parameters adopted in the SLM molding are as follows: a laser power of 80 W, a scanning speed of 300 mm/s, a hatch spacing of 100 μm, a spot diameter of 90 μm, a layer thickness of 20 μm and an interlayer rotation angle of 71°. The laser scanning strategy adopted is the partition island scanning strategy, with a partition width of 3 mm and an overlapping area width of 0.1 mm between partitions.

4) The T4 treatment is conducted on the magnesium alloy in the SLM state prepared in the above 3): The treatment is conducted in the air resistance furnace. Pyrites are put into the furnace to carry out flame retardant protection on the alloy with $SO_2$ gas released by thermal decomposition. The single-step solid solution treatment is adopted: Solid solution is conducted at 500° C. for 2 h, and quenching is then conducted in cold water at 20° C.

5) The magnesium alloy in the T4 state prepared in the above 4) is treated by artificial aging T6 in the constant-temperature oil bath furnace and in a single step. The aging treatment is conducted at 225° C. for 64 h, and quenching is then conducted in cold water at 20° C.

6) The T5 treatment is conducted on the magnesium alloy in the SLM state prepared in the above 3): The treatment is conducted in the constant-temperature oil bath furnace and in a single-step aging way. The aging treatment is conducted at 225° C. for 64 h, and quenching is then conducted in cold water at 20° C.

7) The magnesium alloys in SLM, T4, T6 and T5 states prepared by 3), 4), 5) and 6) above are tested for tensile at room temperature by the Zwick BTC-Z100 electronic universal material testing machine, and the tensile testing rate is 0.5 mm/min.

The obtained alloy in the SLM state shows typical characteristics of rapidly solidified fine grains, with the grains of an α-Mg matrix being fine and uniform (1-3 μm), and the grain boundary β phases being small in the content, fine and dispersed. In the SLM state at room temperature, the tensile yield strength, tensile strength and elongation are 356 MPa, 389 MPa, and 3.9% respectively. In the T6 state at room temperature, the tensile yield strength, tensile strength and elongation are 367 MPa, 423 MPa, and 4.7% respectively. In the T5 state at room temperature, the tensile yield strength, tensile strength and elongation are 411 MPa, 432 MPa, and 1.8% respectively.

Comparative Example 1

The comparative example provides the Mg-RE alloys prepared by gravity casting. The composition of the alloy is basically the same as that of Embodiment 1, except that the preparation method adopted in the comparative example is gravity casting.

Figure 3A:
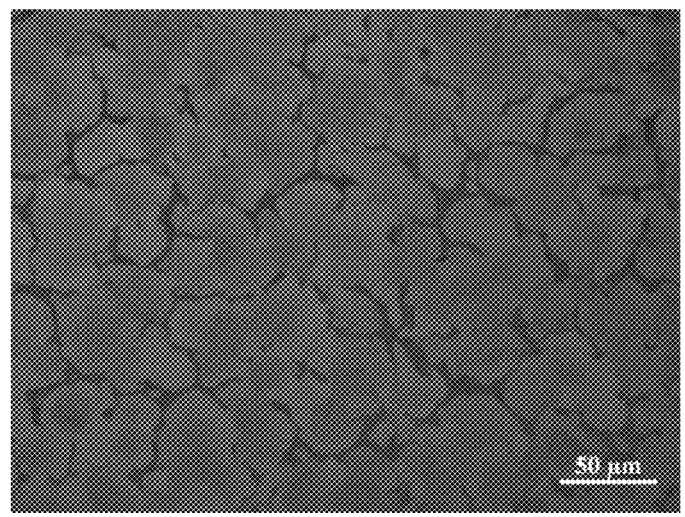
FIGS. 3A and 3B respectively show an OM microstructure diagram and an SEM microstructure diagram of the Mg-11.16Gd-1.72Zn-0.44Zr (wt. %) alloy in a semi-continuous casting state prepared according to comparative example 1 of the disclosure.
Figure 3B:
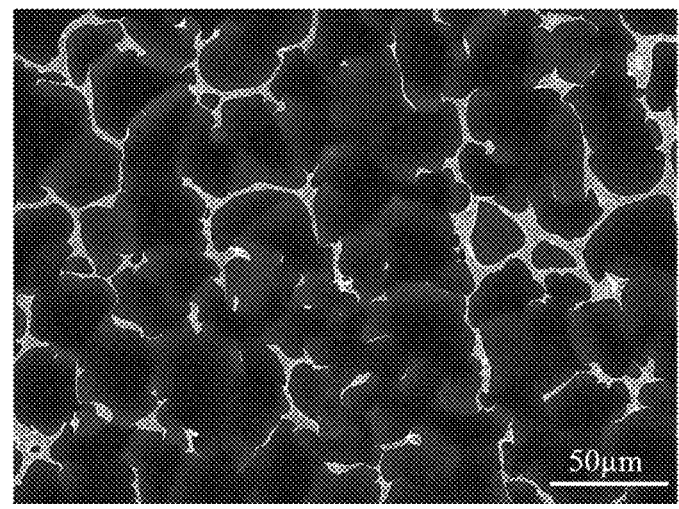

An OM microstructure diagram and an SEM microstructure diagram of the Mg-11.16Gd-1.72Zn-0.44Zr (wt. %) alloy in a semi-continuous casting state prepared according to the comparative example are shown in FIGS. 3A and 3B, respectively. The grain size is about 50 μm, and the grain boundary β phase is lamellar and coarse, showing typical eutectic reaction characteristics. The room-temperature tensile properties of the Mg-11.16Gd-1.72Zn-0.44Zr (wt. %) alloy in different states (As-cast, As-cast T6) are shown in FIG. 2. In the as-cast state at room temperature, the tensile yield strength, tensile strength and elongation are 163 MPa, 210 MPa and 3.6% respectively. After solid solution+aging heat treatment (480° C./12 h+200° C./32 h), the tensile yield strength, tensile strength and elongation are 186 MPa, 258 MPa, and 4.6% respectively in the T6 state at room temperature. The strength and ductility of the alloys prepared by gravity casting are lower than that of the alloys prepared by SLM in the same state, whether in the as-cast or T6 state. The reason for the difference is that the cooling rate of gravity casting is much lower than that of SLM, and the grain size of the α-Mg matrix and the grain boundary β phase are coarse.

Comparative Example 2

The comparative example provides the method for preparing the Mg-RE alloys with high strength and ductility using SLM additive manufacturing technology, which is basically the same as that of Embodiment 1, except that the laser scanning speed adopted by the SLM molding is 1500 mm/s in the comparative example.

In the SLM state at room temperature, the tensile yield strength, tensile strength and elongation are 119 MPa, 122 MPa, and 0.3% respectively. The strength and ductility of the alloy in the SLM state are significantly lower than those of the alloy in the SLM state prepared in Embodiment 1. The reason for the difference is that the laser scanning speed is too fast, which leads to the short laser action time, and the laser energy density is too low to completely melt all the powder, resulting in a large number of incomplete defects.

Comparative Example 3

The comparative example provides the method for preparing the Mg-RE alloys with high strength and ductility using SLM additive manufacturing technology, which is basically the same as that of Embodiment 1, except that the laser hatch spacing adopted by the SLM molding is 150 μm in the comparative example.

In the SLM state at room temperature, the tensile yield strength, tensile strength and elongation are 204 MPa, 221 MPa, and 1.3% respectively. The strength and ductility of the alloy in the SLM state are significantly lower than those of the alloy in the SLM state prepared in Embodiment 1. The reason for the difference is that the laser hatch spacing is too large, which disables the overlapping of scanning tracks, and there are a large number of incomplete defects in the overlapping area of the scanning tracks.

Comparative Example 4

The comparative example provides the Mg-RE alloys prepared by gravity casting. The composition of the alloy is basically the same as that of Embodiment 2, except that the preparation method adopted in the comparative example is gravity casting.

In the as-cast state at room temperature, the tensile yield strength, tensile strength and elongation are 169 MPa, 251 MPa and 5.7% respectively. After solid solution+aging heat treatment (520° C./12 h+200° C./64 h), the tensile yield strength, tensile strength and elongation are 232 MPa, 296 MPa, and 0.6% respectively in the T6 state at room temperature. The strength of the alloys prepared by gravity casting is lower than that of the alloys prepared by SLM in the same state, whether in the as-cast or T6 state. The reason for the difference is that the cooling rate of gravity casting is much lower than that of SLM, and the grain size of the α-Mg matrix and the grain boundary β phase are coarse.

Comparative Example 5

The comparative example provides the method for preparing the Mg-RE alloys with high strength and ductility using SLM additive manufacturing technology, which is basically the same as that of Embodiment 2, except that the laser power adopted by the SLM molding is 40 W in the comparative example.

In the process of forming, the powder spheroidization occurs seriously, and part warping leads to the destruction of a powder scraper, which makes the forming experiment forced to stop. The failure of the metallurgical bonding between adjacent printing layers results in virtually no bonding strength of the molded parts. The reason for the difference is that the laser power is too low to completely penetrate the powder, and the powder is only partially melted, and there is no metallurgical bonding between the powder and the powder.

Specific embodiments of the disclosure are described above. It shall be understood that the disclosure is not limited to the above-mentioned specific embodiments, and that those skilled in the art can make various changes and modifications within the scope of the claims, which shall not affect the substance of the disclosure. In the absence of a conflict, embodiments of the present application can be arbitrarily combined with features in the embodiments.

What is claimed is:

1. A method for preparing magnesium gadolinium (Mg—Gd) alloys using selective laser melting (SLM) additive manufacturing technology, comprising the following steps:
   step A: preparing Mg—Gd—(Zn)—Zr pre-alloyed spherical powder by gas atomization;
   step B: molding the Mg—Gd—(Zn)—Zr pre-alloyed spherical powder using SLM to obtain the Mg—Gd alloys; and
   step C: conducting heat treatment on the Mg—Gd alloys prepared in step B: solid solution heat treatment with aging treatment or only aging treatment;
   wherein in step A, the Mg—Gd—(Zn)—Zr pre-alloyed spherical powder contains the following elements in weight percentages: Gd 10-20%, Zn 0-2%, Zr 0-0.5%, with a balance being Mg and unavoidable impurities, wherein a total amount of the unavoidable impurities is less than 0.02%; and
   wherein in step B, related laser parameters adopted in the SLM molding are as follows: a laser power of 80-160 W, a scanning speed of 100-1000 mm/s, a hatch spacing of 50-100 μm, and a spot diameter of 65-150 μm.

2. The method according to claim 1, wherein in step B, the Mg—Gd—(Zn)—Zr pre-alloyed spherical powder is powder screened with more than 200 mesh.

3. The method according to claim 1, wherein in step B, the Mg—Gd—(Zn)—Zr pre-alloyed spherical powder is dried at 100-200° C. for 1-5 h before the SLM molding.

4. The method according to claim 1, wherein in step B, a laser scanning strategy adopted in the SLM molding is a partition island scanning strategy, with a partition width of 3-6 mm, an overlapping area width of 0.1-0.3 mm between partitions, and an interlayer rotation angle of 70-75°.

5. The method according to claim 1, wherein in step B, other process parameters adopted in the SLM molding are as follows: a layer thickness of 20-40 μm, and a substrate preheating temperature of 25-200° C.

6. The method according to claim 1, wherein in step B, the SLM molding is carried out under a protection of argon gas, and oxygen and water vapor in a molding cabin are lower than 100 ppm during the SLM molding.

7. The method according to claim 1, wherein in step C, the solid solution heat treatment is conducted at 450-520° C. for 15 min-2 h.

8. The method according to claim 1, wherein in step C, the aging treatment is conducted at 175-225° C. for 0-512 h.

* * * * *